United States Patent
Bächle et al.

(10) Patent No.: US 8,573,712 B2
(45) Date of Patent: Nov. 5, 2013

(54) METHOD FOR BLEEDING AN ELECTRONIC VEHICLE BRAKING SYSTEM

(75) Inventors: Martin Bächle, Glashütten (DE); Axel Wagner, Schlüchtern (DE); Michael Hitzel, Rödermark (DE); Thorsten Ullrich, Gernsheim (DE); Jens Lerchenberger, Vienenburg (DE)

(73) Assignee: Continental Teces AG & Co., oHG, Frankfurt (DE)

( * ) Notice: Subject to any disclaimer, the term of this patent is extended or adjusted under 35 U.S.C. 154(b) by 979 days.

(21) Appl. No.: 11/579,009

(22) PCT Filed: Apr. 25, 2005

(86) PCT No.: PCT/EP2005/051846
§ 371 (c)(1),
(2), (4) Date: Aug. 23, 2007

(87) PCT Pub. No.: WO2005/105534
PCT Pub. Date: Nov. 10, 2005

(65) Prior Publication Data
US 2008/0018172 A1    Jan. 24, 2008

(30) Foreign Application Priority Data

Apr. 29, 2004 (DE) .......................... 10 2004 021 274
Jun. 17, 2004 (DE) .......................... 10 2004 029 113
Feb. 26, 2005 (DE) .......................... 10 2005 008 851

(51) Int. Cl.
*B60T 8/36* (2006.01)

(52) U.S. Cl.
USPC ....................................... 303/119.1; 188/352

(58) Field of Classification Search
USPC ................. 188/352; 303/113.1, 113.2, 113.5, 303/115.4, 116.1, 119.1
See application file for complete search history.

(56) References Cited

U.S. PATENT DOCUMENTS

| | | | |
|---|---|---|---|
| 2,295,539 A * | 9/1942 | Beach ........................... | 188/352 |
| 3,339,401 A * | 9/1967 | Peters ........................ | 73/40.5 R |
| 4,946,230 A * | 8/1990 | Sakamoto et al. ......... | 303/113.1 |
| 5,039,175 A | 8/1991 | Holzmann et al. | |
| 5,060,703 A * | 10/1991 | Koerner ......................... | 141/59 |
| 6,179,392 B1 * | 1/2001 | Baechle et al. ............ | 303/113.1 |
| 6,193,031 B1 | 2/2001 | Baechle et al. | |
| 6,199,958 B1 | 3/2001 | Baechle | |
| 6,206,055 B1 * | 3/2001 | Hollub et al. ................... | 141/98 |
| 2004/0040807 A1 | 3/2004 | Burgdorf et al. | |

FOREIGN PATENT DOCUMENTS

| | | |
|---|---|---|
| DE | 3806840 | 9/1989 |
| DE | 3935353 | 4/1991 |
| DE | 10103229 | 8/2002 |
| EP | 0323889 | 7/1989 |

* cited by examiner

Primary Examiner — Xuan Lan Nguyen

(57) ABSTRACT

An electronically controllable brake system includes an electronic controller installed within the motor vehicle for actuating electrohydraulic components of the brake system and for operating the electrohydraulic components during the process of filled with hydraulic fluid and for removing air from hydraulic components of the brake system. A filling sequence is performed according to a predetermined filling profile that utilizes on-board sensors that detect brake system pressure and identify a defined pressure in conformity with a desired filling profile.

18 Claims, 3 Drawing Sheets

METHOD FOR BLEEDING AN ELECTRONIC VEHICLE BRAKING SYSTEM

BACKGROUND OF THE INVENTION

Electronic brake systems for motor vehicles providing functions such as ABS, EBS, or similar functions are based on a mechatronics unit and comprise an electronic control unit (ECU) with an electronic controller that is connected to an electronic vehicle bus system. The mechatronics unit further comprises an accommodating member for hydraulic components (HCU), with electrohydraulic valves and a return pump. Besides, hydraulic conduits for wheel brakes and hydraulic connecting conduits for a master brake cylinder can be connected to the accommodating member.

In electronic brake systems of this type, a secondary fluid circuit is normally completely isolated from a primary hydraulic circuit, which connects the master brake cylinder to the wheel brakes in a conventional manner. This isolation causes difficulties in maintenance work or in the event of a new installation of a brake system because air bubbles in secondary fluid circuits cannot be removed easily by means of bleeding devices of the primary hydraulic circuits. Air inclusions, more specifically, unnecessary compressibilities, are principally not tolerable in a brake system.

Frequently a so-called end-of-line or vacuum filling is performed in vehicle production. More specifically, the hydraulic components of a vehicle brake system are mounted into the vehicle in a manner free from hydraulic fluid, hence in a dry fashion, in order to carry out a so-called vacuum filling with the provided hydraulic fluid at the end of the assembly line. In a first process step, the air disposed in the brake system is sucked off (vacuum phase), in a second step e.g. brake fluid under excess pressure is filled in (filling phase), and in a third step excessively filled-in fluid volume is sucked off (leveling phase). The filling and bleeding of the secondary fluid circuits, which are positioned mainly between normally closed electromagnetic valves (outlet valves) and pump suction valves, is a difficult task. It is necessary for this purpose to switch valves or the return pump of the brake system in a defined and synchronized manner in the individual bleeding and filling phases.

DE 38 06 840 C2 discloses a method of filling a hydraulic unit of an anti-lock control system. To remove air inclusions in the brake system, a bleeding computer equipped with a current supply unit, an operating unit, and a display unit are disclosed. The separate bleeding computer comprises a microprocessor having a special control program for the air removal. In order to actuate the anti-lock control system for air removal purposes, a plug of the cable harness in the vehicle is drawn off from the electronic controller of the anti-lock control system. The electronic controller is then connected separately to the bleeding computer. This allows executing bleeding sequences, in the course of which the return pump and electrohydraulic valves are actuated in order to remove air inclusions in secondary fluid circuits of the hydraulic unit using bleeding devices of primary fluid circuits (more specifically, by means of bleeder screws at wheel brakes).

EP 0 323 889 A1 discloses an anti-skid brake system having an anti-skid operating mode and a bleeding operating mode. In order to adopt the bleeding operating mode, the system, like in DE 38 06 840 C2, is connected to a diagnosis circuit by way of a diagnosis interface and a bleeding plug in order to obtain corresponding release data. In the absence of a correct connection at the diagnosis interface, a normal anti-skid operating cycle will commence. The brake system further comprises devices for disabling the bleeding operating mode when input signals of wheel speed sensors at the electronic control unit (ECU) indicate that the vehicle is moving.

The prior art methods for filling a vehicle brake system consequently found on that in each case there is provision of a separately connected process computer, in order to permit a bleeding or filling mode of an anti-lock control system. In the bleeding or filling mode, the process computer actuates the electronic controller of the anti-lock system and further predetermines a pressure time course for the control of the filling system. This requires in each case an electric connection between the process computer and the electronic controller of the brake system.

An object of the invention is to render possible an improved, more comfortable and also simplified execution of filling and bleeding processes. Another objective is to reach a higher rate of reliability when performing the mentioned processes.

SUMMARY OF THE INVENTION

This object is essentially achieved in that an externally superimposed pressure time course (filling profile) during a filling or bleeding process is identified by means of on-board sensory means, and that the electrohydraulic components of the brake systems are actuated by the electronic controller, as required, in conformity with the identified filling profile. Consequently, the invention is mainly based on the fact that the on-board sensory means have an additional function during bleeding or filling cycles and that the acquired signals and data are evaluated in the electronic controller of the brake system for actuation purposes. It is possible, yet not compulsory, to communicate the acquired process data to a process computer.

Especially pressure thresholds of the determined filling profile are used for the actuation in conformity with demand. The invention permits autonomous bleeding without the necessity of actuating the anti-lock control system by a separate process computer because the program code for the actuation of the electrohydraulic components is provided quasi 'on-board'. Further, since on-board means of the pressure sensor system are employed to detect pressure thresholds, the bleeding condition of the brake system can be determined quasi in-situ. This permits improved quality assurance with a largely automated subsequent treatment at the earliest possible time while the bleeding process is in operation.

The method of the invention imparts the advantage that a process computer of a filling and bleeding device is principally uncoupled from the brake system. It is furthermore favorable that there is no need for a cable connection between the vehicle or control unit (ECU) and the process computer (filling automation). Previously, even several separate branches at the loom of cables of the vehicle had partly been required for this purpose, depending on the motor vehicle maker. These branches can now be economized.

To permit ease of exchange of defective brake assemblies also without process computers, so-called pre-filled brake assemblies have been delivered up to date, which did not require bleeding of the secondary circuits. In contrast thereto, exclusively unfilled brake assemblies shall be delivered in the future, being permanently accompanied on-board by the necessary hardware and software for bleeding and filling the electrohydraulic brake assembly. This imparts to an authorized car mechanic a simple possibility of bleeding and filling a brake assembly delivered in a completely dry state. Consequently, a compelling reason for pre-filling the brake assembly at the premises of the brake manufacturer is overcome. This eliminates the general need for process computers and communication errors and disturbed cable connections between process computers and the electronic controller.

According to a second solution of the problem at issue, an on-board bleeding process for electrohydraulic assemblies for slip-controlled brake systems is provided, and data related to filling and bleeding and information such as the official filling status of the assembly in particular, and information about successfully completed and/or unsuccessfully discontinued bleeding routines of the assembly (without access to an external diagnosis or control unit) are stored in a memory of the controller. This allows a robust bleeding routine which can be performed in a comfortable fashion. This is because data, codes and routines for performing the bleeding routine are provided in a memory of a controller of the hydraulic assembly and are quasi delivered along with the assembly. A diagnosis connection to an external control unit is rendered obsolete. The complexity of work and costs needed by vehicle manufacturers and in workshops reduces because the diagnosis unit becomes unnecessary. Workshops, which do not dispose of a diagnosis unit are enabled to perform a bleeding routine. This will improve the acceptance of electrohydraulic brake systems.

According to another embodiment of the second solution, the memory of the controller includes a program code for a bleeding routine that is input by successfully completing a dial-in routine a condition for the execution of the bleeding routine. The program code consequently is an essential part of the assembly, and the start of a bleeding routine takes place according to a predetermined pattern.

It is furthermore favorable that a program code for input by the dial-in routine is stored in the memory of the controller, and that the dial-in routine is secured by means of a predetermined code. This prevents the factual situation of misuse as well as repair by unauthorized persons.

A practicable process for inputting the program code of the dial-in routine provides that the predetermined code is stored in the memory of the controller, that the dial-in routine comprises identification by input of a code, and with the controller detecting a consistency or discrepancy between the code input and the stored code so that the bleeding routine is released exclusively in the event of code consistency. The code can be input using a predetermined actuation pattern such as especially the number of actuations, frequency of actuation, or actuating speed of man-machine interfaces of the motor vehicle. This concerns e.g. absolutely necessary man-machine interfaces such as in particular key buttons, switches, levers or sensors for the actuation of vehicle components, which in addition to this main actuating function still have a double function for the input of the code. It is principally feasible to integrate all man-machine interfaces of a motor vehicle. In consideration of practical deliberations, however, this refers in particular to the pedal assembly, such as switch and lever positions of gearbox, ignition, window openers, flashers, and similar devices. A numerical or character codification is possible. On top of that, the additional or isolated use of a defined hardware codification by means of a special (workshop) key, a special chip card, or similar devices is feasible.

The subsequent improvement serves for purposes of evidence, according whereto the course and/or the result of the dial-in routine is stored preferably along with an internal system type in the memory of the controller. It is also suitable that data about the course and the result of the bleeding routine are stored in the memory of the controller, while successfully or unsuccessfully completed process steps are recorded. These provisions allow proving e.g. the factual situation of misuse.

It is arranged for in general that the bleeding routine is subdivided into several temporally subsequent steps S1-Sn, and defined system states (B, S, P, F, D, ID) are provided to execute the individual steps S1-Sn, and each step (S1-Sn) includes each one interaction stage (I)—in particular for the operator-controlled dial-out, data input, or any other activity—and each one activity stage (A) for the execution of internal processes. In this arrangement, the bleeding routine makes a distinction between the system states B=busy, S=stopped, P=pause, F=error, D=done, and ID=idle. The system states (B, S, P, F, D, ID) are recorded in the memory.

The operator's primary task is to monitor the process, and he is demanded to acknowledge each interaction stage (I) by means of a confirmation (command: continue) in order to change automatically into the activity stage (A) after confirmation. If the operator does not confirm, the bleeding routine can be transferred into the stopped system state S (stopped) during each step within the interaction stage (I) by abortion (command: abort). This gives the operator full control over the process in spite of high-grade process automation.

A monitor is provided for the bleeding routine. The monitor ensures that an automatic monitoring routine is active during the bleeding routine, which is used for error monitoring, and that in a case of error there is an automatic change into the system state F (error). Depending on the seriousness of an error, a complete abortion of the entire bleeding routine or only abortion of the currently executed step (S) of the bleeding routine in connection with the return to the last interaction stage (I) is suggested. Each abortion must be confirmed.

Furthermore, the invention discloses a device for implementing the method of the invention according to the second solution, and the memory of the controller is designed as an Electrically Erasable Programmable Read Only Memory known as an EEPROM.

In case that the suggested routine shall not be employed for whatever reasons, it is arranged for that the controller includes an interface for an external diagnosis unit and that the provided dial-in routine can be disabled using the external diagnosis unit. This will also take into account the desire to be able to use the conventional previous technology.

The invention will be described in detail hereinbelow by making reference to two schematic drawings, which principally illustrate the procedure.

DETAILED DESCRIPTION OF THE DRAWINGS

The fabrication of the electronic brake system at the premises of a supplier of the brake system ends with a process step allowing the electronic controller to perform an autonomous filling sequence.

Figure 1:
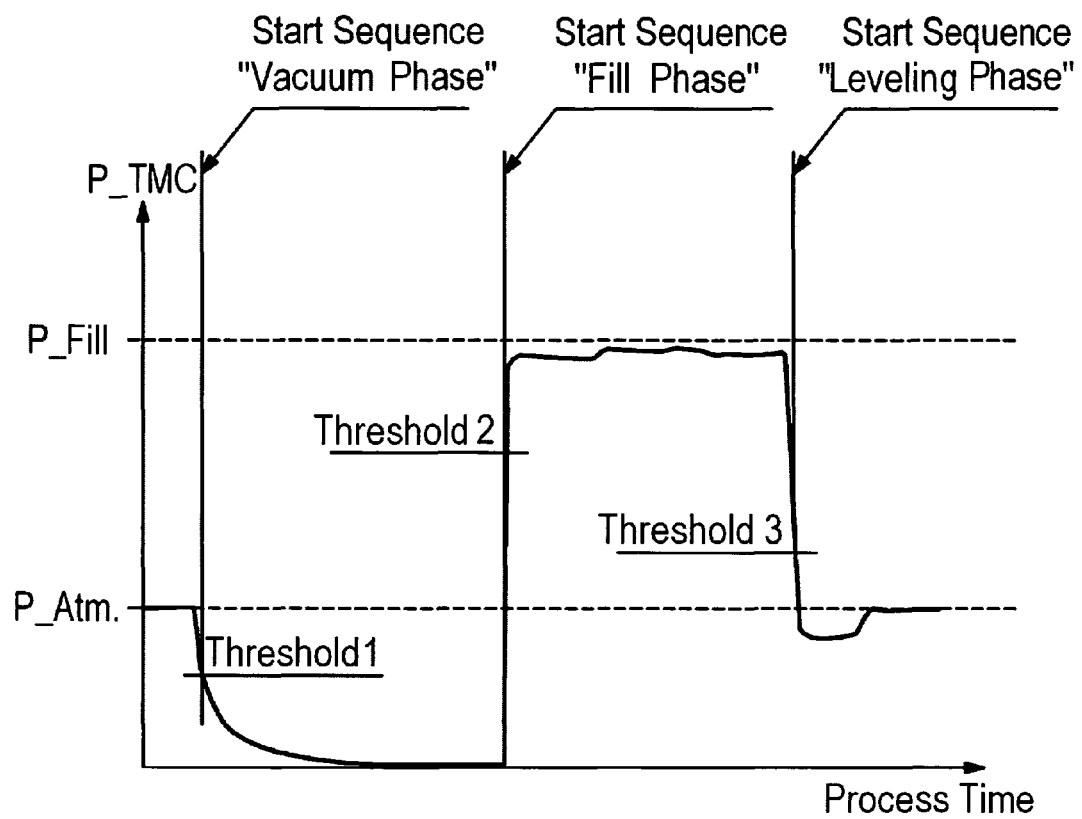
FIG. 1 represents a diagram in which the pressure variation during filling, which is measured at the pressure sensor of the tandem master cylinder (P_Thz), is shown as a function of time.

FIG. 1 represents a diagram in which the pressure variation during filling, which is measured at the pressure sensor of the tandem master cylinder (P_Thz), is shown as a function of time (process time). Depending on the pressure thresholds 1 to 3, the control unit of the brake invokes the usual filling sequences.

When implementing the process of the invention, the subsequently described sequences are executed individually, what is preferred, or in combination.

To fill a dry brake system, e.g. an ignition lock is actuated, and the brake system is supplied with current. Thereafter, the filling process AFS (autonomous filling sequence) is released, i.e. after 'ignition on' the electronic controller of the brake system expects at least the start of a predefined pressure time course (filling profile). This first sequence is also referred to as identifying phase. The brake system is principally inoperative directly before and in the course of the filling process, that means the operating software of the brake system is blocked (software blocking) because the brake system is not filled with the hydraulic fluid. The precise course of a filling sequence is as follows:

- An identifying phase is indicated in particular by a special state of the warning lights of the brake system, e.g. by flashing of warning lights, e.g. of a yellow and a red brake warning lamp. This allows a worker to notice that although the brake system is activated for being filled, it is not yet in the ready state.
- After a positively completed identifying phase, this is preferably acknowledged by a corresponding display (e.g. an accelerated flash rate), and a so-called vacuum phase follows, in the course of which vacuum is aspirated in the brake system.
- After identifying a corresponding pressure threshold (not reached pressure threshold with a correspondingly reduced atmospheric pressure in the brake system), the actual filling sequence (filling phase) commences. In the course thereof, the electronic controller of the brake system starts a switching sequence (in general the outlet valves and electric change-over valves, as well as optionally the return pump, are switched, and the pressure fluid is pressed into the system, preferably under pressure.
- Further, a third threshold is provided with comes along with a corresponding system pressure, and which is subsequent to the first and second pressure thresholds. After the third threshold is reached, a leveling phase is initiated, within which the pressure fluid and, consequently, the fluid level in the brake system are appeased. Should the brake system contain too much hydraulic fluid, it is removed from a fluid reservoir.
- When the mentioned three phases are successfully completed, this fact will be confirmed to the worker e.g. in that the brake warning lamps are extinguished, and the above-mentioned lock of the operating software is removed. Now it is possible for the motor vehicle to perform an ABS control or also a controlled test cycle in the 'end-of-line test'.

If the filling sequence is negatively affected for whatever reasons, e.g. due to vacuum leakage, the electronic controller will detect this fact by way of the pressure time course. It is preferably arranged for that the electronic controller of the brake system reacts appropriately to such interference. A reasonable reaction e.g. consists in that the duration of the current phase is simply extended, or that the controller is switched over into an error mode with automatic or manual subsequent treatment. This can be indicated to the worker by way of a defined code (error signal), and the malfunctioning brake system can be bled manually in a manual subsequent treatment, as the case may be. The error mode can be indicated, for example, by warning lamps that have a special flash. In error cases, it may be arranged for in particular that the operating software of the electronic controller is blocked temporarily or durably. At the end of the manufacturing line (in the End of Line (EOL) test), it is then possible to identify this assembly. The blocking is removed after remedy of the error.

Exceeding or falling below defined pressure time threshold allows stopping the filling process and switching over to an error mode.

Of course, the method of the invention can be executed by means of more than three pressure detection thresholds.

Figure 2:
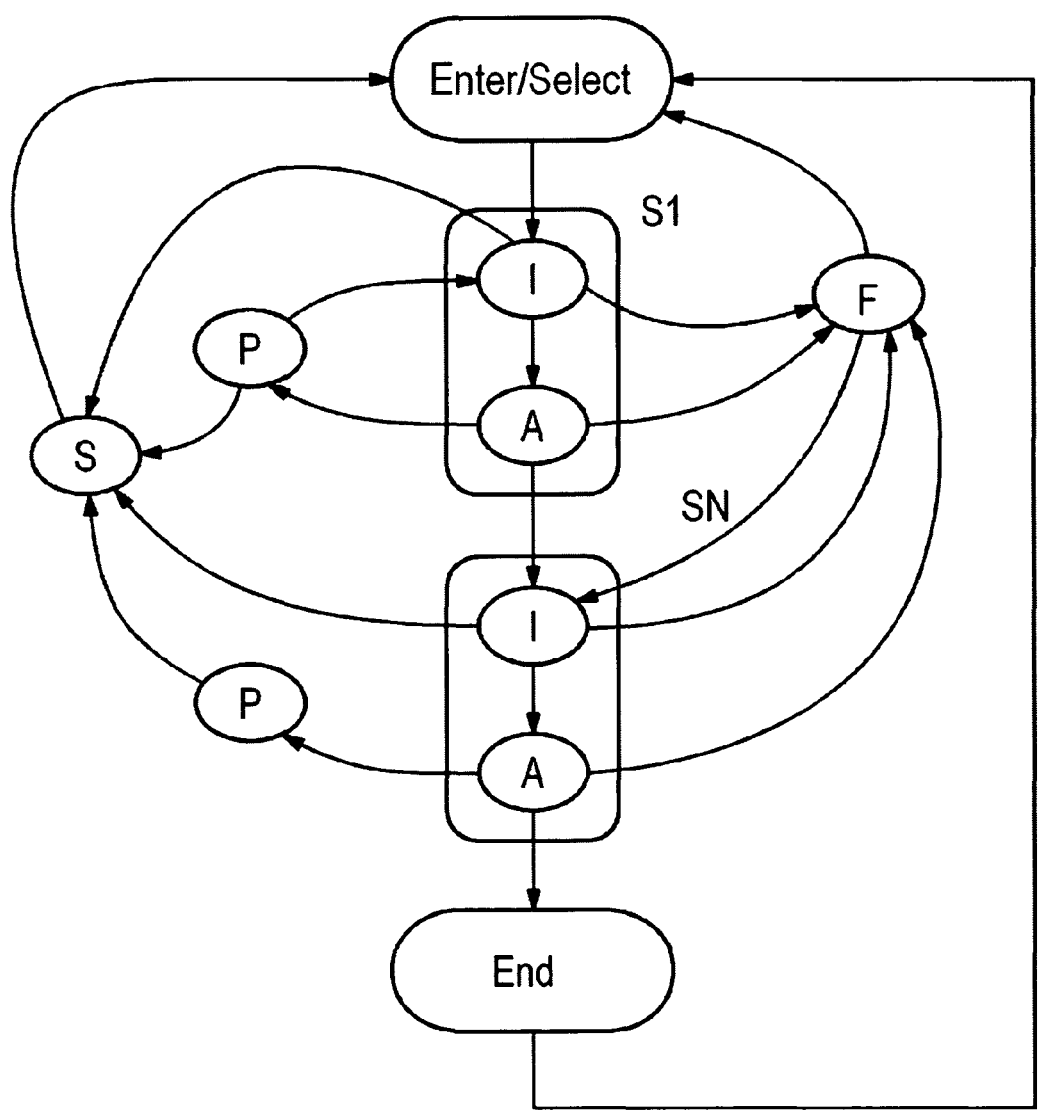
FIG. 2 shows a bubble chart illustrating the bleeding procedure.

The process of FIG. 2 is explained in detail in the following. The basic design of the bleeding routine is in principle equally structured for differently configured systems, which may comprise different functions (ABS only, ABS and traction control (TCS) or ABS and ESP functionality). A basic characteristic of the bleeding routine is the requirement of a code input according to a dial-in routine, which are especially robust vis-à-vis wrong handlings or inadvertent operator actions. This is because each system input or data or performance of an action requires an acknowledging confirmation.

Figure 3:
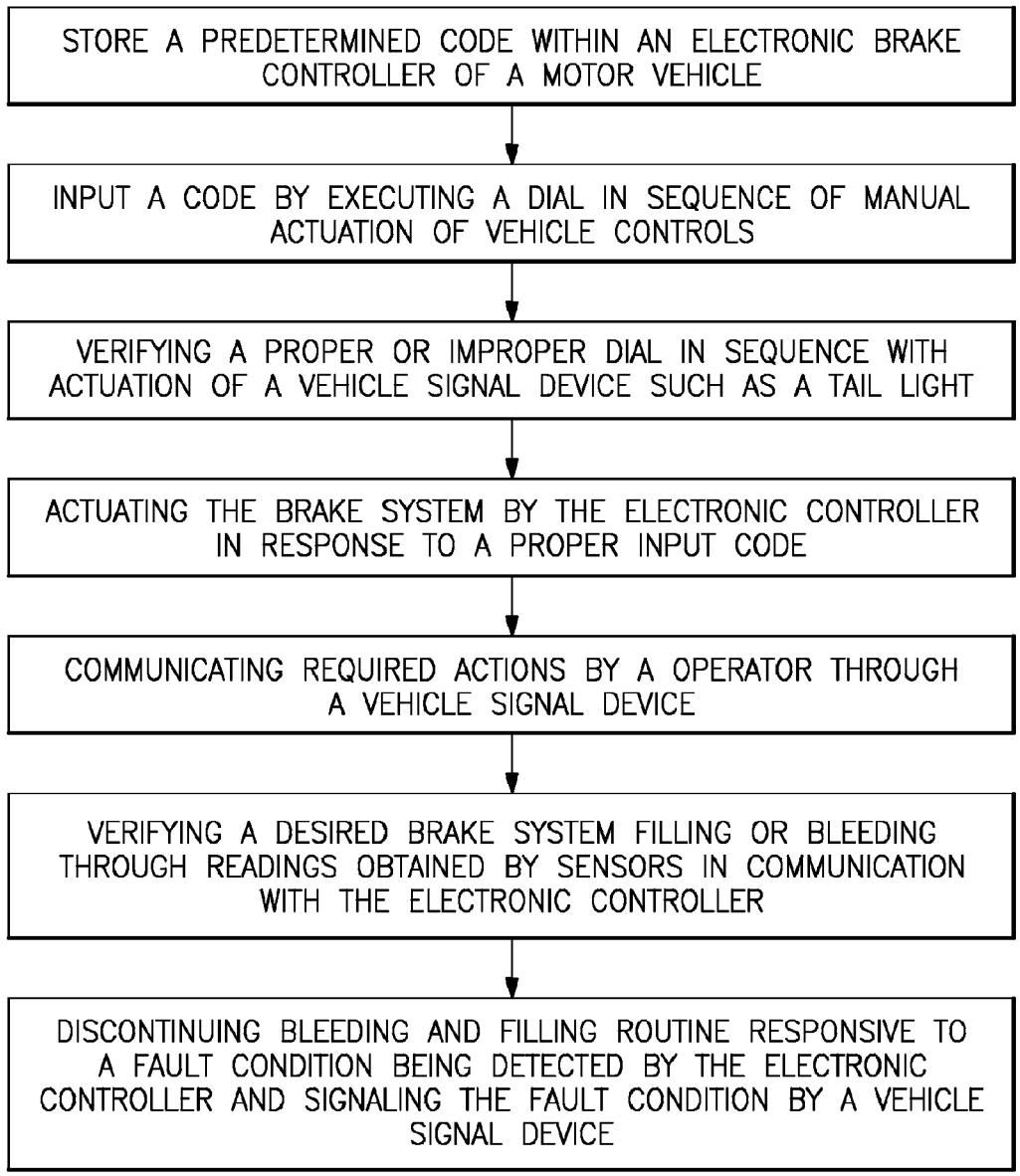
FIG. 3 is a flow diagram schematically illustrating example steps for filling and bleeding a brake system of a motor vehicle.

Referring to FIG. 3, with continued reference to FIG. 2, the operator or worker is furnished quasi with an integrated communication by way of already provided output means (display(s), lights, horn, etc.) along with an integrated menu control, in order to perform the bleeding routine. For example, the worker must provide an input code, and the vehicle brake system acknowledges the correct receipt of this input code by way of the above-mentioned output means using a determined code. This obviates the need for a connection with a separate control or diagnosis unit.

The bleeding routine performed and controlled by the electronic controller and is composed of a sequence of several steps S1, . . . , Sn. Within each step there is an interaction stage I (system state w=waiting, for input or dial-out) as well as each one activity stage A (system state B=busy).

Within the interaction stage I, the operator/worker is induced automatically by a corresponding message by way of a menu system to perform a determined action, input, or the like, such as open a determined bleeder screw at a wheel brake caliper. The performance of the action or input is confirmed by the worker by means of a command (e.g. 'enter, continue').

After confirmation and successful execution of the respective activity stage A of step S, there is automatic relaying to the next step S with its corresponding interaction stage I. Upon expiry of n-steps, there will be the automatic transition into the system state 'D' (done).

There is the possibility in each interaction stage I to discontinue the entire bleeding routine (e.g. with a command 'abort'). In this case, the sequence control branches into a persisting system state 'S' (stopped). The process is quasi pausing. The system state 'S' can principally be reached during each activity because a corresponding input inducing the system state 'S' is brought about, e.g. by pushing a button. The sequence control will then branch into the system state 'P' (pause). The system state 'P' is similar to an interaction stage, i.e. there are commands to continue ('continue') and for definitive abortion ('abort'). The command 'continue' leads to the interaction stage I of the last performed step S, while 'abort', leads to the stop of the current bleeding routine and allows a new start.

A monitor is also provided in the controller, which automatically monitors the bleeding routine. The monitor also monitors whether the conditions for a successful bleeding routine such as a sufficient rate of voltage of the vehicle's electrical system (undervoltage), vehicle standstill, tolerable environmental temperature and temperature of the hydraulic fluid, etc., are given and prevail during the entire process. The monitor can also be used to immobilize the vehicle with respect to further components such as the driving motor, and to illustrate this immobilization in an adequate manner (display, warning lamp, hazard warning lamp operation, connection of the vehicle horn, or similar elements as well as combinations thereof are feasible).

Apart from the bleeding function, it is feasible to permit enabling or disabling defined functionalities such as the TCS or ESP function by the input of specially coded commands. This way it is possible to retrofit a brake system with the mentioned functionalities in a simple manner in a workshop of the vehicle manufacturer, or a customer e.g. uses ESP functionality in a temporally limited manner for the winter months, which will be deactivated automatically or manually after the term allowed.

System or operator errors are detected by the monitor during an dial-in routine or an activity stage A. The reason for errors can e.g. be an undervoltage of the vehicle's electrical system, the setting of error bits by critical monitoring routines, the opening of a wrong bleeder screw at the wheel brake caliper, or similar issues. As a result, there is a transition into the state 'F' (error). The errors are classified. Insignificant errors lead to a conditional return (return to interaction stage I of the current step S). Serious or fatal errors, on the other hand, cause an unconditional return, i.e. an automatic stop of the entire bleeding routine. All system (states) and effects are communicated to the worker in a suitable manner. An error message must be confirmed on principle (for example, by way of the command 'continue').

The transition into the system state 'ID' (idle) takes place from the system state 'S' (stopped), 'F' (failed), 'D' (done) and the subsequent filing in the memory of the controller. The error memory is preferably configured as an EEPROM.

Internal status flags are successively set in the error memory along with a start into a bleeding routine. These flags include the saving of values and states of the individual steps as well as an unsuccessful stop of the bleeding routine (error memory).

It is principally feasible to deal with the bleeding routine redundantly inside the controller, that means to execute the necessary operations, calculations, and similar actions, several times independently of each other inside the controller.

To achieve a fail-safe solution for conventional bleeding, an interface is provided further for connecting the controller to an external diagnosis unit. This fact complies with a customer request and allows bleeding the assembly and the brake system even if the described on-board routine cannot be utilized or shall not be utilized.

It is self-explanatory that the controller is connected to an appropriate sensor system (temperature sensor, pressure sensor(s), brake light switch/brake actuation sensor, or similar components, such as especially a sensor for estimating the quality of the hydraulic fluid (ageing, water contents)) in order to indicate to the driver at an early time that exchange of the hydraulic fluid is necessary, on the one hand. On the other hand, the sensor system is required in order to provide the necessary display and monitoring functions with the necessary information about the system state in and at the brake system.

The invention claimed is:

1. An operator-initiated method of bleeding an electronically controllable brake system with an electronic controller mounted within a motor vehicle for actuating electrohydraulic components of the brake system during normal vehicle operation, wherein hydraulic components such as hydraulic unit, valves, return pump, master brake cylinder, conduits of pipes or hoses are mounted during the assembly of a motor vehicle for providing a brake system, and wherein bleeding sequences are performed according to a predetermined bleeding routine, the method comprising the following steps:
   entering a routine including a predetermined code to gain access to the brake system prior to executing a bleeding routine;
   detecting a bleeding routine including a superimposed pressure time course stored in the electronic controller with an on-board pressure sensor for detecting a brake system pressure;
   disabling normal operation of the brake system;
   actuating the electrohydraulic components of the brake system by means of the electronic controller in conformity with the identified bleeding routine, wherein actuating of the electrohydraulic components is initiated by actuation of an operator actuated control that is part of the motor vehicle;
   confirming successful execution of an activity performed by an operator in response to actuation of an input to the operator operated control by the operator; and
   communicating completion of the bleeding routine by actuation of a signaling device of the motor vehicle, wherein actuation of the signaling device comprises a change of state of the signaling device between on and off conditions.

2. The method for bleeding an electronically controllable brake system as claimed in claim 1, comprising the step of automatically detecting basic steps of the bleeding profile without establishing an electric connection between the brake system and a process computer separate from the motor vehicle.

3. The method for bleeding an electronically controllable brake system as claimed in claim 1, the brake system having at least one pressure sensor employed in the area of the master cylinder, wherein the detection of the bleeding routine or the start of the bleeding operation is performed by means of supplying a signal of the at least one pressure sensor to the controller.

4. The method for bleeding an electronically controllable brake system as claimed in claim 1, comprising the step of identifying a bleeding operation in an identifying phase preceding an actual operating phase of the controller for regular brake operation, wherein the identifying phase is activated with a first activation of the brake system ('ignition on').

5. The method for bleeding an electronically controllable brake system as claimed in claim 1, comprising the steps of monitoring a first pressure detection threshold in an identifying phase, and starting a bleeding operation phase when the pressure drops below the first pressure detection threshold.

6. The method for bleeding an electronically controllable brake system as claimed in claim 1 comprising the step of monitoring at least two pressure detection thresholds.

7. The method as claimed in claim 1, wherein the bleeding routine is subdivided into several temporally subsequent steps S1-Sn, and defined system states (B, S, P, F, D, ID) are provided to execute the individual steps S1-Sn, and each step (S1-Sn) includes each one interaction stage (I) and each one activity stage (A) for the execution of internal processes.

8. The method as claimed in claim 7, wherein the bleeding routine makes a distinction between system states B=busy, S=stopped, P=pause, F=error, D=done, and ID=idle, and wherein the system states (B, S, P, F, D, ID) are recorded in the memory.

9. The method as claimed in claim 7, wherein each interaction stage (I) is completed by means of a confirmation (command: continue), and that there is an automatic change into the activity stage (A) after confirmation.

10. The method as claimed in claim 9, wherein the steps S1-Sn are executed until completion of the bleeding routine.

11. The method as claimed in claim 7, wherein the bleeding routine is transferred into the stopped system state S (stopped) during each step within the interaction stage (I) by abortion (command: abort).

12. The method as claimed in claim 7, comprising an automatic monitoring routine, which is active during the bleeding routine and which is used for error monitoring, the method comprising the step of automatically changing the system into the system state F (error) in case of an error.

13. The method as claimed in claim 12, comprising the steps of determining the seriousness of an error, completely aborting (abort) the entire bleeding routine in case of a serious error, only aborting of the currently executed step (S) of the bleeding routine and suggesting returning to the last interaction stage (I), and demanding a confirmation of each abortion by the operator.

14. A method of bleeding an electronically controllable brake system with an electronic controller mounted within a motor vehicle for actuating electrohydraulic components of the brake system during vehicle operation, wherein hydraulic components such as a hydraulic unit, valves, return pump, master brake cylinder, conduits of pipes or hoses are mounted during the assembly of the motor vehicle for providing a brake system, and wherein bleeding sequences are performed according to a predetermined bleeding routine, the method comprising the step of;

storing data related to bleeding in a memory of the electronic controller mounted within the vehicle;

confirming that a predetermined code has been communicated to the electronic controller, wherein the predetermined code is stored in a memory of the electronic controller and is compared to an input code;

executing the predetermined bleeding routine responsive to confirming that the input code has been successfully executed and is confirmed to correspond with the predetermined code stored in the memory of the electronic controller, wherein execution of the bleeding routine includes sensing a superimposed pressure time course stored in the electronic controller with an on-board pressure sensor for detecting a brake system pressure; and indicating completion of the bleeding routine by actuation of a signaling device of the motor vehicle, wherein actuation of the signaling device comprises a change of state of the signaling device between on and off conditions.

15. The method as claimed in claim 14, wherein the code comprises a dial-in routine executed by means of a predetermined actuation pattern of man-machine interfaces of the motor vehicle.

16. The method as claimed in claim 15, wherein at least one man-machine interface necessary for the actuation of vehicle components has dual function for the dial-in routine and for the actuation.

17. The method as claimed in claim 15, comprising the step of recording and storing data of the dial-in routine in the memory of the controller.

18. The method as claimed in claim 14, comprising the step of recording and storing data of the bleeding routine in the memory of the controller, including successfully or unsuccessfully completed process steps.

* * * * *